United States Patent
Brown

(10) Patent No.: US 8,184,260 B2
(45) Date of Patent: May 22, 2012

(54) NON-LINEAR, DIGITAL DAILIES

(75) Inventor: Terry Scott Brown, Beacon, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 843 days.

(21) Appl. No.: 12/087,638

(22) PCT Filed: Dec. 20, 2006

(86) PCT No.: PCT/US2006/048531
§ 371 (c)(1), (2), (4) Date: Jul. 8, 2008

(87) PCT Pub. No.: WO2007/097801
PCT Pub. Date: Aug. 30, 2007

(65) Prior Publication Data
US 2009/0079864 A1    Mar. 26, 2009

Related U.S. Application Data

(60) Provisional application No. 60/773,806, filed on Feb. 15, 2006.

(51) Int. Cl.
*H04N 7/01* (2006.01)
*H04N 5/04* (2006.01)
(52) U.S. Cl. ............... 352/12; 386/285; 386/201
(58) Field of Classification Search ............ 352/12, 352/5, 22, 23; 386/239, 241, 201, 278, 285
See application file for complete search history.

(56) References Cited

U.S. PATENT DOCUMENTS

| | | | |
|---|---|---|---|
| 4,204,751 A * | 5/1980 | Game et al. .................. 352/17 |
| 4,958,220 A | 9/1990 | Alessi et al. |
| 4,979,032 A | 12/1990 | Alessi et al. |
| 5,594,513 A * | 1/1997 | Stone et al. .................. 352/6 |
| 5,640,320 A * | 6/1997 | Jackson et al. .................. 700/87 |
| 5,745,637 A * | 4/1998 | Phillips et al. ................ 386/201 |
| 5,877,842 A * | 3/1999 | Gibbens et al. ................ 352/12 |
| 6,219,129 B1 | 4/2001 | Kinjo et al. |
| 6,317,191 B1 | 11/2001 | James et al. |
| 6,324,345 B1 | 11/2001 | Enomoto |
| 6,430,355 B1 * | 8/2002 | Nagasawa .................. 386/281 |
| 6,459,825 B1 | 10/2002 | Lippincott |
| 6,539,177 B2 | 3/2003 | Parulski |
| 6,831,729 B1 * | 12/2004 | Davies .................. 352/3 |
| 6,972,828 B2 | 12/2005 | Bogdanowicz et al. |
| 6,985,589 B2 * | 1/2006 | Morley et al. ................ 380/269 |
| 7,024,051 B2 | 4/2006 | Miller et al. |
| 2001/0028406 A1 * | 10/2001 | Tarnoff et al. ................ 348/441 |
| 2002/0024595 A1 * | 2/2002 | Spence et al. .................. 348/96 |

(Continued)

FOREIGN PATENT DOCUMENTS
CN    1672128 A    9/2001
(Continued)

OTHER PUBLICATIONS
International Search Report, dated Jun. 21, 2007.

*Primary Examiner* — William C Dowling
(74) *Attorney, Agent, or Firm* — Robert D. Shedd; Robert B. Levy

(57) ABSTRACT

A method includes storing at least a partial parallelization of at least two of an audio data processing, a video data processing, a synchronized processing of audio and video data from the audio data processing and video data processing, and output processing of the audio and video data from the synchronized processing.

16 Claims, 2 Drawing Sheets

U.S. PATENT DOCUMENTS

| | | |
|---|---|---|
| 2002/0051628 A1 | 5/2002 | Nitta et al. |
| 2002/0131080 A1 | 9/2002 | Enomoto |
| 2003/0026609 A1 | 2/2003 | Parulski |
| 2003/0151776 A1 | 8/2003 | Enomoto |
| 2003/0187820 A1* | 10/2003 | Kohut et al. ............. 707/1 |
| 2003/0223634 A1 | 12/2003 | Gallagher et al. |
| 2005/0134801 A1 | 6/2005 | Bogdanowicz et al. |
| 2005/0165840 A1 | 7/2005 | Pratt et al. |
| 2005/0185055 A1 | 8/2005 | Miller et al. |
| 2006/0001832 A1 | 1/2006 | Bogdanowicz et al. |
| 2008/0218432 A1* | 9/2008 | Ota .................... 345/1.3 |
| 2009/0231459 A1* | 9/2009 | Wayne et al. ......... 348/222.1 |

FOREIGN PATENT DOCUMENTS

| | | |
|---|---|---|
| CN | 1326295 A | 12/2001 |
| EP | 0401365 | 7/1990 |
| EP | 0902581 | 3/1999 |
| EP | 1164801 | 12/2001 |
| EP | 1178666 | 2/2002 |
| EP | 1278099 | 1/2003 |
| EP | 1367816 | 12/2003 |
| WO | WO9007837 | 7/1990 |
| WO | WO9631839 | 10/1996 |
| WO | WO0150195 | 7/2001 |
| WO | WO0196943 | 12/2001 |
| WO | WO0196945 | 12/2001 |
| WO | WO0196947 | 12/2001 |
| WO | WO02054349 | 7/2002 |
| WO | WO 2004/001375 A | 2/2004 |
| WO | WO2005069606 | 7/2005 |

* cited by examiner

NON-LINEAR, DIGITAL DAILIES

CROSS-REFERENCE TO RELATED APPLICATIONS

This application claims the benefit, under 35 U.S.C. §365 of International Application PCT/US2006/048531 filed Dec. 20, 2006, which was published in accordance with PCT Article 21(2) on Aug. 30, 2007, in English and which claims the benefit of U.S. Provisional Patent Application No. 60/773,806, filed Feb. 15, 2006.

FIELD OF THE INVENTION

The present invention relates generally to film processing and, more particularly, to a method and system for producing non-linear digital dailies.

BACKGROUND OF THE INVENTION

A scene is commonly understood to refer to a particular portion of a film's script. Thus, e.g., scene 10 may refer to the car chase and scene 111 may refer to the first scene. A take is one recorded performance of a scene, and each scene may have many takes.

A stick (also known as a clapper) refers to the brightly painted pieces of wood that are brought together with a "clap", at the beginning of each take. The filmed image of the sticks coming together is typically used in conjunction with their recorded sound or report to provide a common audio and visual reference point for synchronization.

As film is being shot, only selected takes are chosen by the Director to be printed. These takes are circled on the camera reports that are sent to the film laboratory along with the original negative. The Production Sound Mixer also indicates the "circled takes" on his/her sound report, which takes are to be transferred from the production sound masters to perforated magnetic film.

The sound for circled takes is typically transferred to a film referred to as a "stripe".

When the negative arrives at the film laboratory it is known as a "camera roll". The camera rolls are developed and then physically cut, with all of the circled takes spliced together into "Lab rolls". The lab rolls are then sent to the dailies facility for transfer.

While the negative is being processed, the production sound masters are being transferred at a separate facility. The production tapes are most commonly digital elements such as DAT (Digital Audio Tape) or any of the newer file based systems, but other mediums including analog tape may be used. At the dailies facility, lab rolls are transferred to either a video tape or file based recording system. Multiple lab rolls are concatenated together to form a "dailies roll or tape".

While the image is being transferred, sound is synchronized with the picture. As is mentioned above, this is typically performed by synchronizing the video of the stick being closed with the audio of the same. This is done for every "circle take" designated by the camera and sound reports.

Accordingly, the process of producing dailies is a serial process where normally one stage must be completed before the next state can begin. Disadvantageously, this results in a time consuming process.

SUMMARY OF THE INVENTION

These and other drawbacks and disadvantages of the prior art are addressed by the present invention, which is directed to a method and system for producing non-linear digital dailies.

According to an aspect of the present principles, there is provided a storage for allowing at least a partial parallelization of at least two of an audio data processing, a video data processing, a synchronization of audio and video data from the audio data processing and video data processing, and output processing of the synchronized audio and video data.

According to another aspect of the present principles, there is provided a system for generating digital dailies. The system includes a common storage device, an audio ingest station, an image ingest station, a virtual telecine, and an output station. The audio ingest station is in signal communication with the common storage device, and is for processing audio data and storing the processed audio data in the common storage device. The image ingest station is in signal communication with the common storage device, and is for processing video data and storing the processed video data in the common storage device. The virtual telecine is in signal communication with the common storage device, and is for synchronizing the processed video data with the processed audio data, and storing the synchronized video data and audio data in the common storage device. The output station is in signal communication with the common storage device, and is for processing the synchronized video data and audio data to output the digital dailies there from. The common storage device allows for at least a partial parallelization of at least some processes performed by at least two of the audio ingest station, the image ingest station, the virtual telecine, and the output station.

According to a further aspect of the invention, a method includes storing at least a partial parallelization of at least two of an audio data processing, a video data processing, a synchronized processing of audio and video data from the audio data processing and video data processing, and output processing of the audio and video data from the synchronized processing.

According to a yet further aspect of the present principles, there is provided a method for generating digital dailies. The method includes designating a common storage device. The method also includes performing an audio ingest process that processes audio data, and storing the processed audio data in the common storage device. The method further includes performing an image ingest process that processes video data, and storing the processed video data in the common storage device. The method additionally includes performing a synchronization process that synchronizes the processed audio data with the processed video data, and storing the synchronized video data and audio data in the common storage device. Also, the method includes performing an output process that processes the synchronized video data and audio data to output the digital dailies there from. The common storage device allows for at least a partial parallelization of at least some of the processes performed by at least two of the audio ingest station, the image ingest station, the virtual telecine, and the output station.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
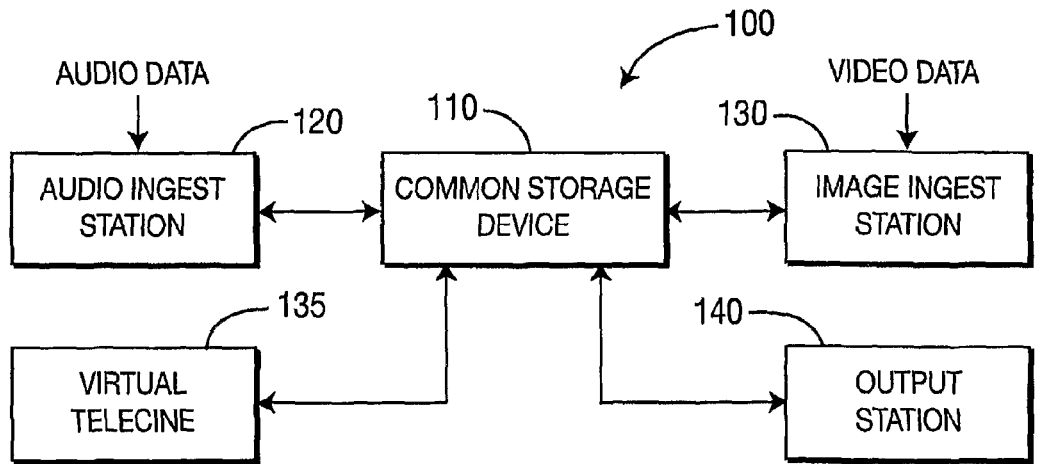
FIG. 1 is a block diagram for a system for generating digital dailies in accordance with an exemplary embodiment of the present principles.

The present invention is directed to a method and apparatus for producing non-linear digital dailies. Advantageously, the present principles allow for the parallelization of a typically serial process to provide an expedited result.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As noted above, the present principles are directed to non-linear digital dailies. In contrast to the film dailies generation process of the prior art which is a serial and, thus, time consuming process, embodiments of the present principles allow for the generation of digital dailies in a non-linear (parallel) fashion. In this way, the generation of digital dailies may be performed in a parallel manner to increase the efficiency thereof.

In an embodiment, the generation of digital dailies is performed using five elements. These five elements may be considered sub-processes and/or sub-parts of a dailies generation method and system in accordance with an embodiment of the present principles. However, it is to be appreciated that the five elements may be readily redefined and/or otherwise modified to include a different number of elements, while maintaining the spirit of the present principles. In the embodiment, the five elements include: a common storage device; audio ingest; image ingest; color correcting and synchronizing or "syncing" for short (collectively also referred to herein as "Dailies in a Box" or "virtual telecine"); and Output and Delivery (herein also referred to simply as "output"). It is to be appreciated that while the color correction will typically be used in most cases of dailies generation, it is nonetheless deemed an optional portion herein. The common storage device may be implemented, for example, using a Storage Area Network (SAN) and/or a Network Attached Storage (NAS) device. The common storage device is accessible by each of the four remaining elements, and may be considered to be part of each of the remaining four elements. In an embodiment, a typical configuration will be one audio ingest station, one image ingest station, two dailies in a box stations and two output stations per system.

Turning to FIG. 1, a system for generating digital dailies is indicated generally by the reference numeral 100. The system 100 includes a common storage device 110, an audio ingest station 120, an image ingest station 130, a virtual telecine 135, and an output station 140. It is to be appreciated that the present principles are not strictly limited to the preceding elements and, corresponding configurations thereof and, given the teachings of the present principles provided herein, one of ordinary skill in this and related arts will contemplate these and other elements and corresponding configurations for generation digital dailies in a parallelized manner, while maintaining the scope of the present principles.

In an embodiment, audio ingest may involve the following. As file based audio systems are becoming the conventional means of recording production audio, the audio ingest element may utilize such file based audio recording systems and/or other types of audio recording systems. Regardless of whether recorded on tape or files, all takes are ingested onto the common storage device (SAN/NAS). Ingest software may then be used to digitally analyze the material and reference the "claps" of each take by generating an index pointer list (indexing sample offsets into the file). This process is faster than real time. Once complete an operator jumps to each generated index point and enters the associated metadata (scene and take) into a database (may include the following illustrative fields: index location; Sound Roll Number; Scene and Take; and so forth).

In an embodiment, image ingest may involve the following. A telecine device may be used to transfer image essence to the common storage. The telecine may be calibrated to one standardized "exposure" by the operator at the beginning of their session and no further calibration is necessary for the remainder of the session. Film spatial positioning and framing is performed to the customer's framing chart. The operator then will load lab rolls and transfer images to the common storage. The telecine can run at 30 frames per second, which is twenty five percent faster than "real time". While transferring the material, the operator may manually mark visual stick closures or white flashes creating an index list for use during the latter syncing process. This list is not frame accurate but allows quick searching to closure points. Additionally, KeyKode may be automatically read and embedded into the header of the resulting image files. All material may be transferred (print all). A single operator can potentially transfer 8 hours of material per 8-hour shift, thus feeding multiple virtual telecines (Dailies in a Box).

In an embodiment, Dailies in a Box (Virtual Telecine) may involve the following. Since the audio may be processed while the file in at the lab, shortly after the first lab roll is being transferred the "colorist" or dailies operator can start moving from take to take, color correcting and syncing the sound track. The syncing process may be performed by searching to the index points from an image capture step and then stepping to the frame where the stick is closed. The operator may then select the corresponding audio material from a menu (using the database from the audio ingest station). This designates the sync point. The operator may then apply a color correction and jump to the next image index point and generate an output point. A timeline database may be built with metadata from the audio, image and locally generated input and output points as well as color correction data. The operator may continue this operation until he/she has synced and color corrected all material for the project transferred that day. The operator can then continue onto the next project.

In an embodiment, the output and delivery element may involve the following. The output and delivery element is essentially identical to the "Dailies in a Box" element except there is no color correction control panel. The output and delivery element shares the same storage as the previous elements allowing simultaneous access to content. This means that it is possible for the dailies generation system to start an output before the previous step (Dailies in a Box) is finished. Since the output system is in real time and the previous step can be faster than real time, an overall time savings is realized over the prior art. If the amount of material was large enough it is possible that the output operation could start before the initial ingest is complete. The operator in this step may perform the final Quality Control and packaging of the "Dailies". The operator takes the timeline from the syncing and color correction element and creates a new time line based on real tape lengths. Further, the material can be sorted to different orders base on metadata such as scene and take (as opposed to "shoot" order).

In an embodiment, a non-linear digital dailies generation system in accordance with the present principles may have one audio transfer station, one image transfer station, two "Dailies in a Box" (Virtual Telecine) station and two output stations. This configuration could support 4-6 sets of dailies (individual projects) per day. Typically, a traditional telecine room (telecine, color corrector and operator) can only do one set of dailies per shift/day. Of course, given the teachings of the present principles provided herein, it is to be appreciated that embodiments of the present principles are not limited to solely the number of elements specified above and, thus, other numbers of elements and sub-elements may also utilized while maintaining the spirit of the present principles.

It is to be appreciated that the embodiment of the present principles shown and described with respect to FIG. 1 is one implementation of a system for non-linearly generation digital dailies. Further details and arrangements of corresponding elements are also shown and described with respect to FIGS. 2-4.

Figure 2:
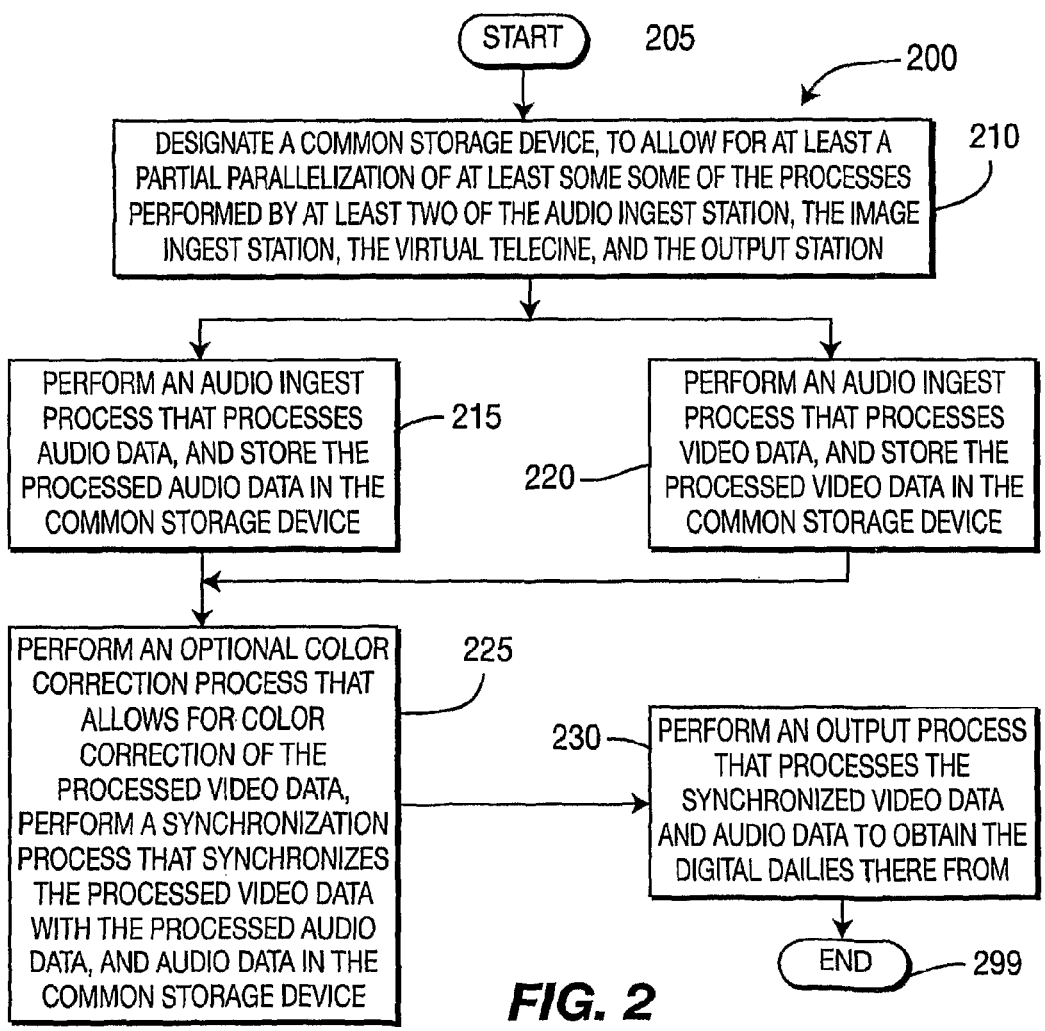
FIG. 2 is a flow diagram for a method for generating digital dailies in accordance with an exemplary embodiment of the present principles.

Turning to FIG. 2, a method for generating digital dailies is indicated generally by the reference numeral 200. The method 200 includes a start block 205 that passes control to a function block 210. The function block 210 designates a common storage device for use by the method 200 to allow for at least a partial parallelization of at least some of the processes performed by at least two of the audio ingest station, the image ingest station, the virtual telecine, and the output station, and passes control to one or both of a function block 215 and a function block 220. It is to be appreciated that while function block 215 and 220 are shown in parallel in FIG. 2, the processes performed by the function block 225 may also be performed at least partially in parallel with at least one of the processes performed by at least one of the function blocks 215, 220, and 230, the processes performed by the function block 230 may also be performed at least partially in parallel with at least one of the processes performed by at least one of the function blocks 215, 220, and 225, and so on.

The function block 215 performs an audio ingest process that processes audio data, stores the processed audio data in the common storage device, and passes control to either a function block 225.

The function block 220 performs a video ingest process that processes the video data, stores the processed video data in the common storage device, and passes control to a function block 225.

The function block 225 performs an optional color correction process that allows for color correction of the processed video data, performs a synchronization process that synchronizes the processed video data with the processed audio data, stores the synchronized video data and audio data in the common storage device, and passes control to the function block 230.

The function block 230 performs an output process that processes the synchronized video data and audio data to obtain the digital dailies there from, and passes control to an end block 299.

Figure 3:
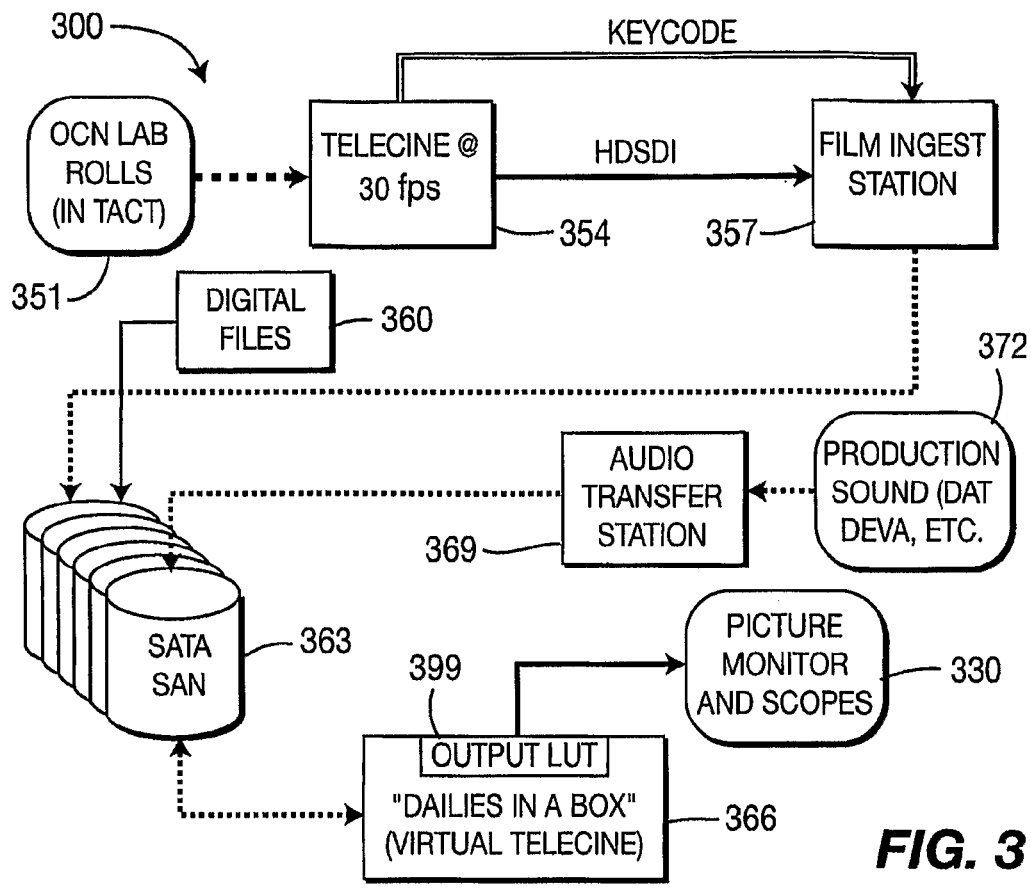
FIG. 3 is a high-level block diagram for a dailies operations portion of a film processing system in accordance with an exemplary embodiment of the present principles.

Turning to FIG. 3, a dailies operations portion of a film processing system is indicated generally by the reference numeral 300.

The dailies operations portion 300 includes Original Camera Negative (OCN) lab rolls 351, a telecine (operating at, e.g., 30 frames per second (fps)) 354, a film ingest station 357, optional digital files 360 from a digital camera, a Serial Advanced Technology Attachment (SATA) Storage Area Network (SAN) device 363, a "telecine in a box" system (hereinafter "virtual telecine") 366 having an output Look Up Table (LUT) 399, a picture monitor and scopes 330, an audio transfer station 369, and a production sound system (digital Audio Tape (DAT), DEVA, and so forth) 372.

The OCN lab rolls 351 are input to the telecine 354. The telecine 354 outputs key codes and a High Definition Serial Digital Interface (HDSDI) 4:4:4 10 bit log (colorspace) stream to the film ingest system 357. The film ingest station 357 provides data to the SATA SAN device 363.

The production sound system 372 provides an audio output signal to the audio transfer station 369 which, in turn, provides an output signal representing audio to the SATA SAN device 363.

The virtual telecine 366 is connected to the SATA SAN device 363. Moreover, the virtual telecine 366 provides a linear signal (converted from a logarithmic signal) and a print emulation signal to the picture monitor and scopes 330.

The telecine 354 may be calibrated at the start of a session using, e.g., appropriate calibration film.

The OCN lab rolls 351 are "put up" on the Telecine 366, with all of the rolls 351 printed with the key code set at 30 fps. Operation may be halted for reframing. A white flash detector may be used for indexing.

A 24 P High Definition (HD) signal in 4:4:4 10 bit log format, with key codes, is stored in the DXP file format on the SATA SAN device 363.

Audio is ingested as Broadcast Wave Format (BWF) files to San-Sticks, and a scene, take and SR metadata database is created. This operation may be performed while the film is being developed.

The Telecine 366 builds a timeline and color correction list. Regarding the Telecine 366: (1) operator parks on stick closure of take; (2) grading is set (either printer light or lift, gamma, gain); (3) call up matching take from audio database or enter scene and take data if Mit Out Sprechen (MOS); (4) operator plays beginning and end of take then jumps to next take; and (5) once all takes are complete, timeline and media is passed to output system (not shown).

Figure 4:
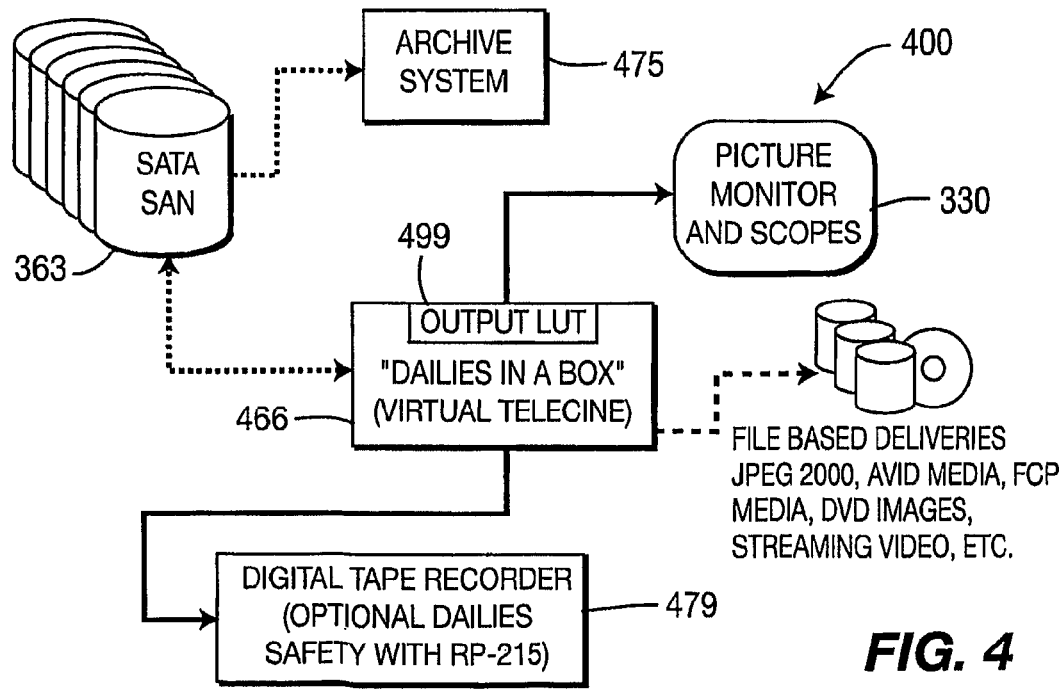
FIG. 4 is a high-level block diagram for a dailies operations output and quality control (QC) portion of a film processing system in accordance with an exemplary embodiment of the present principles.

Turning to FIG. 4, a dailies operations output and quality control (QC) portion of a film processing system is indicated generally by the reference numeral 400.

The dailies operations output and quality control portion 400 includes a SATA SAN device 363, an archive system 475, an output station 466 having an output Look Up Table (LUT) 499, a picture monitor and scopes 330, and a digital tape recorder 479.

The SATA SAN device 363 is connected to the archive system 475 and to the output station 466. The output station 466 is connected to the picture monitor and scopes 330 and the digital tape recorder 479.

During play out, dailies are subject to quality control and are verified for accuracy.

RP-215 is generated for a High Definition (HD) output safety Copy. An SR dailies safety copy may be logarithmic.

Window burns may be generated for a Standard Definition (SD) output.

File based deliverables may be generated for "tape-less" deliveries and may be represented as, e.g.: Joint Photographic Expert Group (JPEG) 2000 with metadata; Digital Versatile Disc (DVD) images with random access menus (both SD and HD); avid media and bin; final cut pro media and eXtended Markup Language (XML); and low bit rate for streaming applications.

Color management for viewing may be applied.

CDL may be saved for later color correction in preview and DI processes.

A description will now be given regarding some of the advantages/features provided by embodiments of the present principles.

Embodiments of the present principles provide an accurate key code reading system, having the ability to guarantee accuracy with intelligent analysis of reads, and the ability to use soft reframing and still maintain accuracy.

Moreover, embodiments of the present principles provide cross play-transfer at 30 fps, and playback at 24 fps.

Regarding audio, embodiments of the present principles may provide one or more of the following advantages/features: (1) file based import or AES real-time capture; (2) software sample rate conversion; (3) a "stick finder" application for locating sticks; (4) database creation or import for metadata, regarding, e.g., sound rolls, scenes, and takes; and (5) time code from wither imported files or LTC.

A "Telecine in a Box" (hereinafter "Telecine") in accordance with the present principles provides audio syncing and picture grading. Using a database from an audio ingest station, a timeline entry is created by manually parking a picture on a stick closure and recalling the appropriate audio event. The Telecine may consolidate metadata collection for such items including, but not limited to, key code or original digital camera code, camera roll and lab roll, camera, sound roll, sound time code, virtual dailies tape time code (timeline code), scene, and take. Deliverables provided or involving the Telecine include, but are not limited to: High Definition (HD) or Standard Definition (SD) tape with PR-215 and PR 188 for HD and Vertical Interval Time Code (VITC) for SD; DVD Images with menus for scene random access; JPEG 2000 dailies elements; avid media and bin; final cut pro media and XML; and file source for streaming video.

Thus, it is to be appreciated that embodiments of the present principles provide an efficient and expedient system and method for the non-linear (parallelized) generation of digital dailies.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A system for generating digital dailies, comprising:
   a common storage device (110);
   an audio ingest station (120), in signal communication with said common storage device, for processing audio data and storing the processed audio data in the common storage device;
   an image ingest station (130), in signal communication with said common storage device, for processing video data and storing the processed video data in the common storage device;
   a virtual telecine (135), in signal communication with said common storage device, for color correcting the processed video data and synchronizing the color-corrected processed video data with the processed audio data, and storing the synchronized video data and audio data in the common storage device; and
   an output station (140), in signal communication with said common storage device, for processing the synchronized video data and audio data to output the digital dailies therefrom,
   wherein the common storage device allows for at least a partial parallelization of at least some processes performed by at least two of the audio ingest station, the image ingest station, the virtual telecine, and the output station.

2. The system of claim 1, wherein the digital dailies correspond to one of television dailies and motion picture dailies.

3. The system of claim 1, wherein said audio ingest station (120) is capable of performing an audio processing process faster than real-time.

4. The system of claim 1, wherein the audio data processed by the audio ingest station (120) is extracted from any of a tape and a file.

5. The system of claim 1, wherein the video data processed by the image ingest station (130) is extracted from film.

6. The system of claim 1, wherein the image ingest station (130) comprises a telecine.

7. The system of claim 1, wherein the output process performed by said output station (140) comprises at least one of a quality control process, an output file creation process, and a packaging process.

8. The system of claim 1, wherein the common storage device comprises at least one of a Storage Area Network device and a Network Attached Storage device.

9. A method for generating digital dailies, comprising:
   performing (215) an audio ingest process that processes audio data, and storing the processed audio data in a common storage device;
   performing (220) an image ingest process that processes video data, and storing the processed video data in the common storage device;
   performing (225) a color correction process and a synchronization process, the synchronization process synchronizing the processed audio data with the color corrected processed video data, and storing the synchronized video data and audio data in the common storage device; and
   performing (230) an output process that processes the synchronized video data and audio data to output the digital dailies there from,
   wherein the common storage device allows for at least a partial parallelization of at least some of the processes performed by at least two of the audio ingest station, the image ingest station, the virtual telecine, and the output station.

10. The method of claim 9, wherein the digital dailies correspond to one of television dailies and motion picture dailies.

11. The method of claim 9, wherein the audio ingest process is capable of being performing faster than real-time.

12. The method of claim 9, wherein the audio data processed by the audio ingest process is extracted from any of a tape and a file.

13. The method of claim 9, wherein the video data processed by the image ingest process is extracted from film.

14. The method of claim 9, wherein the image ingest process utilizes a telecine.

15. The method of claim 9, wherein the output process comprises at least one of a quality control process, an output file creation process, and a packaging process.

16. The method of claim 9, wherein the common storage device comprises at least one of a Storage Area Network device and a Network Attached Storage device.

* * * * *